United States Patent
Tomo

(10) Patent No.: US 9,586,572 B2
(45) Date of Patent: Mar. 7, 2017

(54) HYBRID VEHICLE

(71) Applicant: Toyota Jidosha Kabushiki Kaisha, Toyota-shi, Aichi-ken (JP)

(72) Inventor: Kentaro Tomo, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 210 days.

(21) Appl. No.: 14/528,217

(22) Filed: Oct. 30, 2014

(65) Prior Publication Data

US 2015/0141198 A1    May 21, 2015

(30) Foreign Application Priority Data

Nov. 18, 2013 (JP) .................................. 2013-237861

(51) Int. Cl.
| | | |
|---|---|---|
| *B60W 10/08* | (2006.01) | |
| *B60W 10/06* | (2006.01) | |
| *B60W 10/02* | (2006.01) | |
| *B60K 6/442* | (2007.10) | |
| *B60W 20/00* | (2016.01) | |

(52) U.S. Cl.
CPC ............. *B60W 10/08* (2013.01); *B60K 6/442* (2013.01); *B60W 10/02* (2013.01); *B60W 10/06* (2013.01); *B60W 20/20* (2013.01); *B60W 2510/087* (2013.01); *B60W 2510/244* (2013.01); *B60W 2520/10* (2013.01); *Y02T 10/6234* (2013.01); *Y02T 10/7258* (2013.01); *Y10S 903/93* (2013.01); *Y10T 477/26* (2015.01)

(58) Field of Classification Search
CPC ...... B60W 10/02; B60W 10/06; B60W 10/08; B60W 20/10; B60W 20/20; B60W 2510/087; B60W 2510/244; B60W 2520/10

See application file for complete search history.

(56) References Cited

U.S. PATENT DOCUMENTS

| | | | |
|---|---|---|---|
| 2011/0036652 A1 | 2/2011 | Honda et al. | |
| 2011/0111905 A1* | 5/2011 | Tiwari | B60K 6/365 475/2 |
| 2015/0087457 A1 | 3/2015 | Hayashi et al. | |

FOREIGN PATENT DOCUMENTS

| | | |
|---|---|---|
| GB | 2508665 A | 6/2014 |
| JP | 11-275710 | 10/1999 |
| JP | 2006-044649 A | 2/2006 |
| JP | 2008-265598 A | 11/2008 |
| JP | 4958126 B2 | 6/2012 |
| WO | 2013-140537 A1 | 9/2013 |

* cited by examiner

*Primary Examiner* — Huan Le

(74) *Attorney, Agent, or Firm* — Dinsmore & Shohl LLP

(57) ABSTRACT

A hybrid vehicle of the present invention includes: an engine, a first motor, a second motor, a clutch and an electronic control unit. The first motor is connected with an output shaft of the engine. The second motor is connected with a driving wheel and configured to generate a driving torque at the driving wheel. The clutch is arranged between the output shaft of the engine and the driving wheel and configured to engage or disengage the output shaft of the engine and a rotary shaft connected with the driving wheel. The electronic control unit is configured to control the clutch to be engaged and control the first motor to generate the driving torque at the driving wheel, when the second motor cannot generate a predetermined output torque and the clutch is disengaged.

6 Claims, 6 Drawing Sheets

HYBRID VEHICLE

INCORPORATION BY REFERENCE

The disclosure of Japanese Patent Application No. 2013-237861 filed on Nov. 18, 2013 including the specification, drawings and abstract is incorporated herein by reference in its entirety.

BACKGROUND OF THE INVENTION

1. Field of the Invention

The present invention relates to a hybrid vehicle, and in particular relates to the control of a vehicle capable of changing a driving manner of transmitting power from a plurality of power sources such as an engine or a motor and the like to a driving wheel.

2. Description of Related Art

In the past, in a hybrid vehicle carrying an engine, a driving motor and a generator for power generation, a structure capable of switching a driving pattern of a series mode and a driving pattern of a parallel mode is well known (Japanese Patent No. 4958126).

However, when the temperature of the driving motor is high in high-load operation or after high-load operation, or when the state of charge (SOC) of a battery which supplies power to the driving motor is reduced or the temperature is high, the upper limit value of a driving torque which can be generated in the driving motor is reduced. Therefore, it is likely that, when the vehicle starts, the driving torque required by a driver cannot be generated.

SUMMARY OF THE INVENTION

The present invention provides a hybrid vehicle that is able to generate a driving torque corresponding to the requirement of a driver even under the condition that the output of a motor generating the driving torque is limited.

The hybrid vehicle of the present invention includes: an engine; a first motor connected with an output shaft of the engine; a second motor connected with a driving wheel and configured to generate a driving torque at the driving wheel; a clutch arranged between the output shaft of the engine and the driving wheel, and configured to engage or disengage the output shaft of the engine and a rotary shaft connected with the driving wheel; and an electronic control unit configured to control the clutch to be engaged and control the first motor to generate the driving torque at the driving wheel, when the second motor cannot generate a predetermined output torque and the clutch is disengaged.

Thereby, the clutch is engaged when the second motor can not generate the predetermined output torque, and the first motor is controlled to generate the driving torque at the driving wheel, so that the limited amount of output torque in the second motor can be compensated through the first motor. Thus, a hybrid vehicle that is able to generate a driving torque corresponding to the requirement of a driver even under the condition that the output of a motor generating the driving torque is limited can be provided.

The electronic control unit may also control the clutch to be engaged, control the engine to stop and control the first motor to generate the driving torque at the driving wheel, when the second motor cannot generate the predetermined output torque and the clutch is disengaged.

Thus, the engine is in the stop state, so that fuel consumption and exhaust generated when the engine operates can be inhibited.

Moreover, the hybrid vehicle may further include a motor temperature sensor for detecting the temperature of the second motor. The electronic control unit may also control the first motor to compensate the shortfall of the output torque of the second motor by the output torque of the first motor, when the temperature of the second motor is higher than a threshold.

Thus, under the condition that the driving torque required for the second motor exceeds the upper limit value of the output torque of the second motor, the exceeding amount maybe compensated by using the output torque of the first motor, so that the vehicle can generate the driving torque corresponding to the requirement of the driver.

Moreover, the electronic control unit may also control the first motor to generate the driving torque at the driving wheel, when the speed of the vehicle is lower than a threshold.

Thus, the first motor is controlled in a running area where the speed is lower than the threshold to generate the driving torque at the driving wheel, so that the driving torque corresponding to the requirement of the driver can be generated when accelerating, e.g. when the vehicle starts.

Moreover, the hybrid vehicle further may include an electrical storage device for supplying power to the second motor. The electronic control unit can also control the first motor to generate the driving torque at the driving wheel, when the state quantity representing the charge state of the electrical storage device is greater than a threshold.

Thus, under the condition that the state quantity representing the charge state of the electrical storage device is greater than the threshold, the first motor is controlled to generate the driving torque at the driving wheel, so that the driving torque required by the driver can also be generated even if the engine is maintained in the stop state.

Moreover, the electronic control unit may also control the first motor to stop generating the output torque when the vehicle speed becomes higher than a threshold, after the first motor is controlled to generate the driving torque at the driving wheel.

Thus, after the first motor is controlled to generate the driving torque at the driving wheel, the first motor can stop generating the output torque at an appropriate time.

Moreover, the electronic control unit may also control the first motor to stop generating the output torque when the depressing amount of an accelerator pedal is smaller than a first threshold and the variation of the depressing amount in the direction of returning the accelerator pedal is smaller than a second threshold, after the first motor is controlled to generate the driving torque at the driving wheel.

Thus, after the first motor is controlled to generate the driving torque at the driving wheel, the first motor can stop generating the output torque at an appropriate time.

According to the present invention, the clutch is engaged when the second motor can not generate the predetermined output torque, and the first motor is controlled to generate the driving torque at the driving wheel, so that the limited amount of the output torque in the second motor can be compensated through the first motor. Thus, a hybrid vehicle that is able to generate a driving torque corresponding to the requirement of a driver even under the condition that the output of a motor generating the driving torque is limited can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the present invention will be described below with reference to the accompanying drawings. In the description below, the like components are indicated by the like reference signs. The names and functions of the components are identical. Therefore, the components are not redundantly described in detail.

Figure 1:
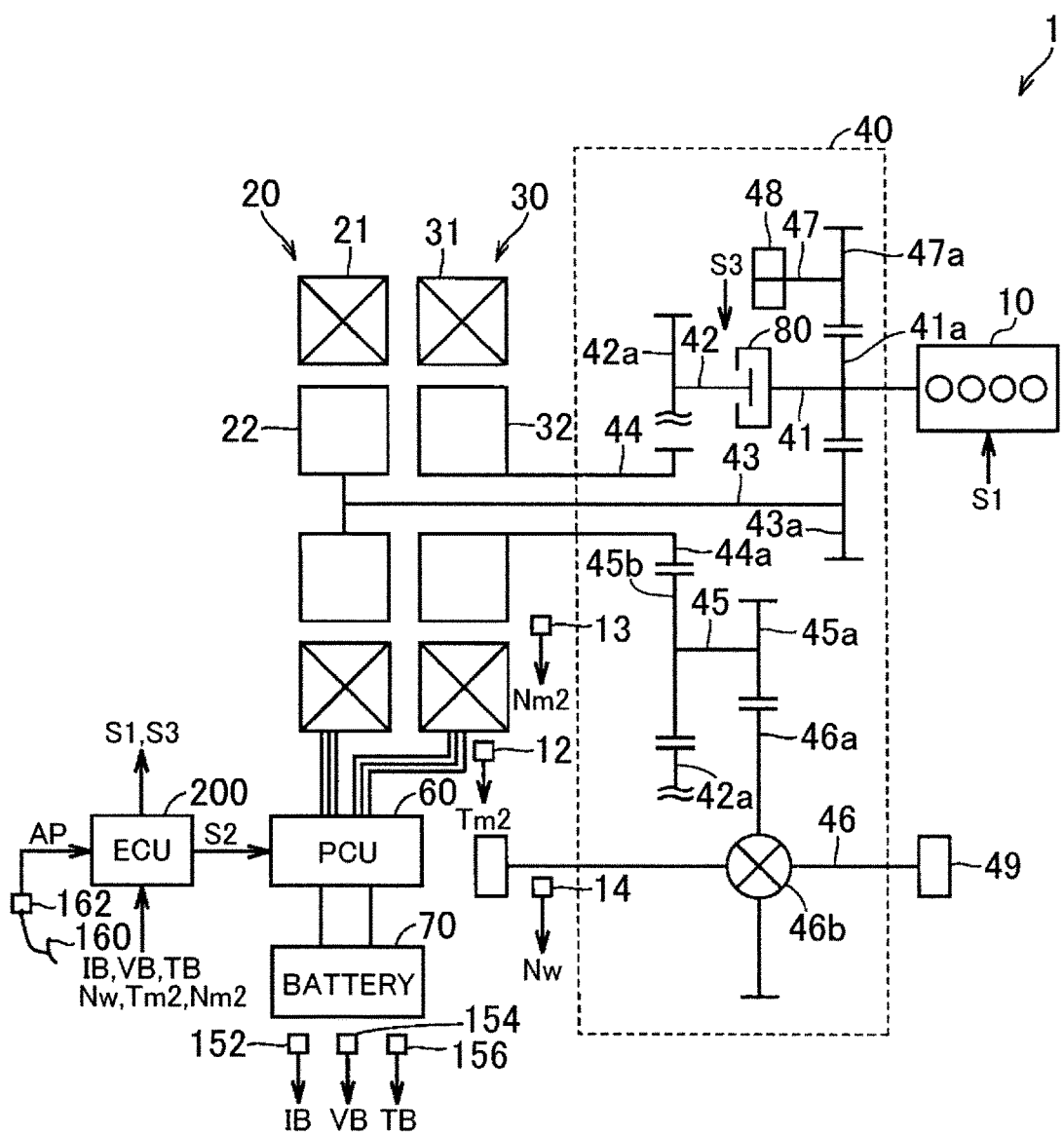
FIG. 1 is a block diagram of a hybrid vehicle as whole of an embodiment.

Referring to FIG. 1, a block diagram of a hybrid vehicle 1 as whole (only referred as vehicle 1 below) of an embodiment will be described. The vehicle 1 includes an engine 10, a transmission 40, a first motor generator 20 (referred as first MG 20 below), a second motor generator 30 (referred as second MG 30 below), a driving wheel 49, a PCU (Power Control Unit) 60, a battery 70 and an ECU (Electronic Control Unit) 200.

The engine 10 is an internal combustion engine such as a gasoline engine or a diesel engine with a plurality of cylinders. The engine 10 is controlled based on a control signal S1 from the ECU 200.

The first MG 20 is a three-phase alternating current motor, for example. The first MG 20 is driven by the PCU 60. The first MG 20 has a function of a generator for generating power by using the power of the engine 10 and charging the battery 70 through the PCU 60, or supplying the generated power to the second MG 30. In addition, the first MG 20 has a function of a starter for receiving the power from the battery 70 to rotate an output shaft of the engine 10, namely a crankshaft, so that the engine 10 is started. The first MG 20 includes a first stator 21 and a first rotor 22. As mentioned below, the first MG 20 is a motor connected with the output shaft of the engine 10.

The second MG 30 is a three-phase alternating current motor, for example. The second MG 30 is driven by the PCU 60. The second MG 30 has a function of a driving motor for providing a driving force for the driving wheel 49 by using at least one of the power stored in the battery 70 and the power generated by the first MG 20. In addition, the second MG 30 has a function of a generator for using the power generated through regenerative braking and charging the battery through the PCU 60. The second MG 30 includes a second stator 31 and a second rotor 32. As mentioned below, the second MG 30 is a motor which is connected with the driving wheel 49 and can generate a driving torque at the driving wheel 49 by generating an output torque.

A resolver 13 is arranged at the second MG 30 and configured to detect the rotating speed Nm2 of the second MG 30. The resolver 13 transmits a signal representing the detected rotating speed Nm2 to the ECU 200. In addition, a resolver may also be arranged in the first MG 20.

A motor temperature sensor 12 is arranged at the second MG 30 and configured to detect the temperature Tm2 of the second MG 30. The motor temperature sensor 12 transmits a signal representing the detected temperature Tm2 of the second MG 30 to the ECU 200.

The first MG 20 and the second MG 30 are accommodated in a case of the transmission 40, for example. The first stator 21 and the second stator 31 are fixed in the case of the transmission 40. The first rotor 22 and the second rotor 32 are supported by bearing portions such as bearings arranged in the case of the transmission 40 in a free rotating manner.

The battery 70 is a electrical storage device, and is a rechargeable direct current power supply. A secondary battery of nickel metal hydride or lithium ion and the like is used as the battery 70, for example. The battery 70 can be charged by the power supplied by an external power supply (not shown in the figures) besides the power generated by the first MG 20 and/or the second MG 30. In addition, the battery 70 is not limited to the secondary battery, and can be a battery capable of generating a direct current voltage, e.g. a capacitor, a solar cell, a fuel cell or the like.

The battery 70 is provided with a current sensor 152, a voltage sensor 154 and a battery temperature sensor 156. The current sensor 152 is configured to detect the current IB of the battery 70. The current sensor 152 transmits a signal representing the current IB to the ECU 200. The voltage sensor 154 is configured to detect the voltage VB of the battery 70. The voltage sensor 154 transmits a signal representing the voltage VB to the ECU 200. The battery temperature sensor 156 is configured to detect the battery temperature TB of the battery 70. The battery temperature sensor 156 transmits a signal representing the battery temperature TB to the ECU 200.

The ECU 200 estimates the state quantity representing the state of charge (referred as SOC (State Of Charge) below) of the battery 70 based on the current IB, voltage VB and battery temperature TB of the battery 70. The ECU 200 may also estimate an OCV (Open Circuit Voltage) based on the current, voltage and battery temperature, for example, and estimates the SOC of the battery 70 based on the estimated OCV and a predetermined map. Alternatively, the ECU 200 may also estimate the SOC of the battery 70 by accumulating the charge current and discharge current of the battery 70, for example.

The PCU 60 includes a plurality of switching elements. The PCU 60 converts the DC power stored in the battery 70 into the AC power for driving the first MG 20 and the second MG 30 by controlling the switch-on and switch-off actions of the switching elements. The PCU 60 includes an inverter and a converter (not shown in the figure) controlled by a control signal S2 from the ECU 200. The converter boosts the voltage of the DC power from the battery 70 and outputs the direct current to the inverter. The inverter converts the direct current output by the converter into alternating current and outputs the alternating current into the first MG 20 and/or the second MG 30. Thus, the first MG 20 and/or the second MG 30 are driven by using the power stored in the battery 70. In addition, the inverter converts the alternating current generated by the first MG 20 and/or the second MG 30 into direct current and outputs the direct current to the converter. The converter reduces the DC voltage output by the inverter and outputs it to the battery 70. Thus, the battery 70 is charged by using the power generated by the first MG 20 and/or the second MG 30. In addition, the converter can also be omitted.

The transmission 40 transmits power between the engine 10 and the first MG 20, between the engine 10 and the driving wheel 49, between the second MG 30 and the driving wheel 49 or between the first MG 20 and the driving wheel 49.

The transmission 40 is provided with a plurality of rotary shafts and a plurality of gears for transmitting the power received from at least any one structural component of the engine 10, the first MG 20, the second MG 30 and the driving wheel 49 to other structural components.

The plurality of rotary shafts are rotationally supported by bearing portions such as bearings arranged in the case of the transmission 40. Each of the plurality of gears is fixed on any of the plurality of rotary shafts and a differential mechanism 46b. In addition, in this embodiment, the differential mechanism 46b is illustrated as a structure accommodated in the case of the transmission 40, and may also be accommodated in an additional gear case different from the transmission 40 (e.g. the condition that the driving mode of the vehicle is FR (Front engine Rear drive) is a typical example).

In this embodiment, the transmission 40 is provided with engine shafts 41 and 42, an MG inner shaft 43, an MG outer shaft 44, an idle shaft 45, a driving shaft 46 and a pump shaft 47, which are used as the plurality of rotary shafts.

One end of the engine shaft 41 is connected with the crankshaft of the engine 10. The engine shaft 41 and the crankshaft of the engine 10 are connected with each other through a spline, for example. A gear 41a is fixed on the engine shaft 41 in a manner that the rotating center is consistent with that of the engine shaft 41. The other end of the engine shaft 41 is connected with one end of a clutch 80.

The clutch 80 is arranged on a power transmission path between the engine 10 and the driving wheel 49. The clutch 80 engages or disengages the output shaft of the engine 10 and the rotary shaft connected with the driving wheel 49. The clutch 80 receives a control signal S3 from the ECU 200 and is switched from any of an engaged state and a disengage state to the other state. The other end of the clutch 80 is connected with one end of the engine shaft 42.

Under the condition that the clutch 80 is in the engaged state, the engine shafts 41 and 42 rotate integrally, and power is transmitted between the engine shafts 41 and 42. Thus, a power transmission state of transmitting the power between the engine 10 and the driving wheel 49 may be realized. Under the condition that the clutch 80 is in the disengage state, the power transmission between the engine shafts 41 and 42 is cut off.

A gear 42a meshed with a gear 45b described below is fixed at the other end of the engine shaft 42 in a manner that the rotating center is consistent with that of the engine shaft 42.

A gear 43a meshed with the gear 41a is fixed at one end of the MG inner shaft 43 in a manner that the rotating center is consistent with that of the MG inner shaft 43. The other end of the MG inner shaft 43 is fixed on the first rotor 22 in a manner that the rotating center is consistent with that of the first rotor 22 of the first MG 20. The hollow MG outer shaft 44 which may be relatively rotationally arranged on the MG inner shaft 43 is arranged on the outer periphery of the MG inner shaft 43.

A gear 44a is fixed at one end of the MG outer shaft 44 in a manner that the rotating center is consistent with that of the MG outer shaft 44. The other end of the MG outer shaft 44 is fixed on the second stator 31 in a manner that the rotating center is consistent with that of the second stator 31 of the second MG 30.

A gear 45a (final gear) is fixed at one end of the idle shaft 45 in a manner that the rotating center is consistent with that of the idle shaft 45. A gear 45b meshed with the gear 42a and the gear 44a respectively is fixed at the other end of the idle shaft 45 in a manner that the rotating center is consistent with that of the idle shaft 45.

The differential mechanism 46b is connected with the left and right driving wheels 49 through the left and right driving shafts 46 respectively. A gear 46a meshed with the gear 45a is fixed on the differential mechanism 46b in a manner that the rotating center is consistent with that of the differential mechanism 46b. The differential mechanism 46b is a mechanism for absorbing the rotating speed difference of the left and right driving wheels 49 generated in the turning process of the vehicle 1 and the like, for example.

A gear 47a is fixed at one end of the pump shaft 47 in a manner that the rotating center is consistent with that of the pump shaft 47. The other end of the pump shaft 47 is connected with an input shaft of an oil pump 48. The gear 47a is meshed with the gear 41a fixed on the engine shaft 41. Thus, if the engine 10 is in an operating state, the power of the engine 10 is transmitted to the oil pump 48, so that the oil pump 48 operates. When the oil pump 48 operates, oil (operating oil) in the transmission 40 is circulated in a predetermined circulation path formed in the transmission 40. The oil is circulated in the predetermined circulation path, so that lubrication of each rotary shaft and each gear in the case of the transmission 40, cooling of the first MG 20 and the second MG 30 and the like can be realized.

A wheel speed sensor 14 detects the rotating speed Nw of the driving wheel 49. The wheel speed sensor 14 transmits a signal representing the detected rotating speed Nw to the ECU 200. The ECU 200 calculates the vehicle speed V based on the received rotating speed Nw. In addition, the ECU 200 may also calculate the vehicle speed V based on the rotating speed Nm2 of the second MG 30 rather than the rotating speed Nw.

An accelerator pedal 160 is arranged at a driver's seat. A pedal stroke sensor 162 is arranged on the accelerator pedal 160. The pedal stroke sensor 162 detects the depressing amount (stroke amount) AP of the accelerator pedal 160. The pedal stroke sensor 162 transmits a signal representing the depressing amount AP to the ECU 200. In addition, the pedal stroke sensor 162 may also be substituted by an accelerator pedal depressing force sensor for detecting the depressing force on the accelerator pedal 160 from a driver of the vehicle 1.

The ECU 200 generates the control signal S1 for controlling the engine 10 and outputs the generated control signal S1 to the engine 10. In addition, the ECU 200 generates the control signal S2 for controlling the PCU 60 and outputs the generated control signal S2 to the PCU 60.

The ECU 200 is a control device for controlling the whole hybrid system, namely, the charge/discharge state of the battery 70 and the action states of the engine 10, the first MG 20 and the second MG 30, by controlling the engine 10 as well as the PCU 60 and the like, so that the vehicle 1 may run with the highest efficiency.

The vehicle 1 with the above-mentioned structural elements includes a first power transmission path for transmitting the output torque of the second MG 30 to the left and right driving wheels 49 so that the vehicle 1 runs and a second power transmission path for transmitting the output torque of the engine 10 to the driving wheels 49 so that the vehicle 1 runs, and one of or both of the two power transmission paths are used for running.

In the first power transmission path, the gear 41a of the engine shaft 41 and the gear 43a of the MG inner shaft 43 are in an engaged state, and thus the first rotor 22 of the first MG 20 is rotated by using the power of the engine 10, so that power is generated in the first MG 20. The power generated in the first MG 20 is supplied to the second MG 30 through the PCU 60. In addition, the power generated in the first MG 20 may also be supplied to the battery 70 through the PCU 60. The second MG 30 rotates the MG outer shaft 44 by using the power supplied by the first MG 20. Because the gear 44a of the MG outer shaft 44 is meshed with the gear 45b, the idle shaft 45 is rotated through the rotation of the MG outer shaft 44. Because the gear 45a of the idle shaft 45 is meshed with the gear 46a, the differential mechanism 46b and the driving shaft 46 is rotated through the rotation of the idle shaft 45. Through the rotation of the driving shaft 46, the driving wheel 49 generates a driving torque. In this way, the output torque of the engine 10 can be completely converted into electrical energy by using the first MG 20 to realize the so-called series operation.

On the other hand, in the second power transmission path, the clutch 80 is in the engaged state, so that the output torque of the engine 10 is transmitted to the driving shaft 46 and the driving wheel 49 through the engine shafts 41 and 42, the gear 42a, the gear 45b, the idle shaft 45, the gear 45a, the gear 46a and the differential mechanism 46b. At the moment, the gear 41a of the engine shaft 41 and the gear 43a of the MG inner shaft 43 are always in an engaged state, and thus the engine 10 is in the operating state, so that the first MG 20 is also utilized to generate power. Thus, the second MG 30 rotates by using the power generated by the first MG 20, and the vehicle 1 is driven by a driving torque obtained by adding a driving torque based on the output torque of the engine 10 and a driving torque based on the output torque of the second MG 30. In this way, the vehicle 1 is driven by using the engine and the second MG 30 to realize the so-called parallel operation.

In addition, besides the series operation and the parallel operation, zero torque control may be performed on the first MG 20 and the second MG 30 so that the drag loss is minimized and the vehicle runs only by using the engine 10, or the engine 10 can stop and the vehicle runs only by using the second MG 30.

In vehicle 1 with the above structure, when the temperature of the second MG 30 for generating a driving force rises in high-load operation or after high-load operation, or when the temperature TB of the battery 70 which supplies power to the second MG 30 is high, the upper limit value of the driving torque which can be generated by the second MG 30 is reduced, resulting in that when the vehicle 1 starts, the driving torque required by the driver cannot be generated.

Then, in this embodiment, it is characterized in that: when the second MG 30 can not generate a predetermined output torque in the disengagement of the clutch 80, the ECU 200 controls the clutch 80 to be engaged to form an engaged state, and controls the first MG 20, so that a driving torque is generated at the driving wheel 49.

In addition, when the second MG 30 can not generate the predetermined output torque in the disengagement of the clutch 80, the ECU 200 not only controls the clutch 80 to be engaged to form the engaged state, but also controls the engine 10 to be in a stop state and controls the first MG 20, so that the driving wheel 49 generates the driving torque.

In addition, under the condition that the motor temperature Tm2 of the second MG 30, detected by the motor temperature sensor 12, is higher than a threshold Tmc, the ECU 200 controls the first MG 20, so that the reduction amount of the upper limit value of the output torque of the second MG 30 is compensated by using the output torque of the first MG 20.

Figure 2:
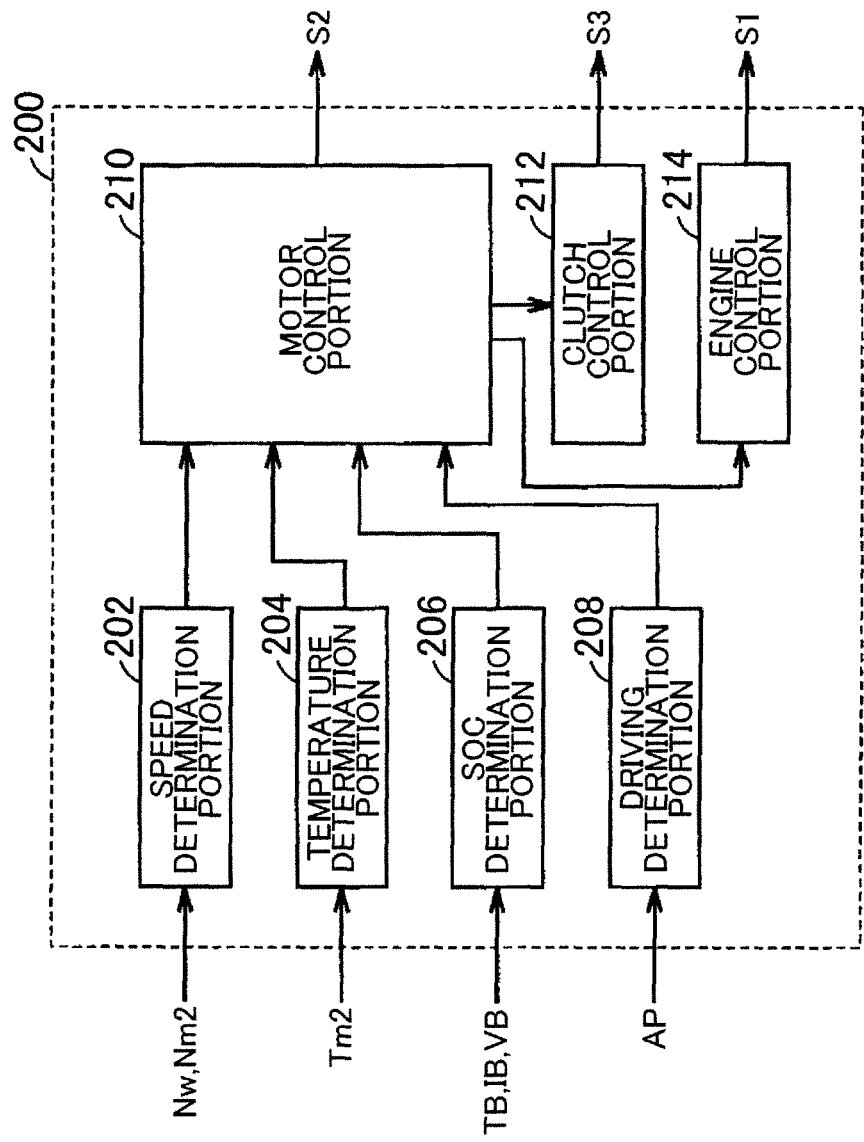
FIG. 2 is a functional block diagram of an ECU.

FIG. 2 shows a functional block diagram of the ECU 200 carried in vehicle 1 of this embodiment. The ECU 200 includes a speed determination portion 202, a temperature determination portion 204, an SOC determination portion 206, a driving determination portion 208, a motor control portion 210, a clutch control portion 212 and an engine control portion 214. In addition, these structures can be realized by software such as programs or by hardware.

Under the condition that the vehicle is not in an temperature restriction mode (e.g. under the condition that the execution flag of the temperature restriction mode is in a non-set state) as described below, the speed determination portion 202 determines whether the vehicle speed V is lower than a threshold Vs. The threshold Vs is a value for determining whether the vehicle 1 is in a stop state (substantially the vehicle speed V is zero), e.g. a value of about 1 km/h. In addition, under the condition that the vehicle is not in the temperature restriction mode and the vehicle speed V is lower than the threshold Vs, the speed determination portion 202 may also set the speed determination flag to be in a set state.

Under the condition that the vehicle is in the temperature restriction mode (e.g. under the condition that the execution flag of the temperature restriction mode is in a set state), the speed determination portion 202 determines whether the vehicle speed V is lower than a threshold Vf. The threshold Vf is a value for determining whether the vehicle 1 is in a running state at a predetermined speed, e.g. 30 km/h. In addition, under the condition that the vehicle is in the temperature restriction mode and the vehicle speed V is lower than the threshold Vf, the speed determination portion 202 may also set the ending determination flag to be in the set state.

The temperature determination portion 204 determines whether the motor temperature Tm2 of the second MG 30 is greater than the threshold Tmc. The threshold Tmc is used for determining whether the value of the upper limit value of the torque command value for the second MG 30 needs to be limited for the purpose of protecting the second MG 30 from raising the temperature of the second MG 30. In addition, when the motor temperature Tm2 of the second MG 30 is greater than the threshold Tmc, the temperature determination portion 204 may also set the motor temperature determination flag to be in a set state.

The SOC determination portion 206 determines whether the SOC of the battery 70 is greater than a threshold SOC (0). The threshold SOC (0) is a value as follows: even if the SOC is reduced due to the vehicle 1 runs for predetermined period in a state that the first MG 20 and the second MG 30 generate a driving torque respectively, the predetermined SOC (e.g. above the lower limit value of the SOC) may also be ensured. The threshold SOC (0) is calculated, for example, by adding the predetermined quantity and the lower limit value of the SOC of the battery 70. In addition, when the SOC of the battery 70 is greater than the threshold SOC (0), the SOC determination portion 206 may also set the SOC determination flag to be in a set state.

The driving determination portion 208 determines whether the vehicle 1 is in a state wherein no regeneration process is performed by the second MG 30 (that is, a state that a state that the vehicle 1 is in power running or a state that the running power of the vehicle 1 is zero). For example, in the case that the torque command value transmitted to the second MG 30 is a value of power running side (a value of a driving torque generated in the direction in accordance with the running direction of the vehicle 1), that is, in the case that the torque command value transmitted to the second MG 30 is not the value of a regeneration side), the driving determination portion 208 determines that the vehicle 1 is in a state of power running (namely in the state which is not in the regeneration process for performing regeneration by the second MG 30). Alternatively, under the condition that the required driving torque (or the required power) required for the vehicle 1 based on the depressing amount AP of the accelerator pedal 160 and the vehicle speed V is above a threshold, or under the condition that the depressing amount AP of the accelerator pedal 160 is above a threshold, the driving determination portion 208 determines that the vehicle is in the state which is not in the regeneration process for performing regeneration by the second MG 30. In addition, under the condition of determining that the vehicle is in the state which is not in the regeneration process for performing regeneration by the second MG 30, the driving determination portion 208 may also set the driving determination flag to be in a set state.

The motor control portion 210 controls the PCU 60, so as to generate a driving torque required for the second MG 30 in the required driving torque required for the vehicle 1 based on the depressing amount AP of the accelerator pedal 160. In this embodiment, the motor control portion 210 at least controls the output torque of the second MG 30 according to any of a normal control mode and a temperature restriction mode.

The normal control mode is a mode in which the second MG 30 alone generates the driving torque required for the second MG 30 in the required driving torque. The temperature restriction mode is a mode in which the second MG 30 alone generates or the first MG 20 and the second MG 30 generate the driving torque required for the second MG 30 in the required driving torque. In addition, for example, the normal control mode is selected as an initial mode.

Under the condition that the speed determination portion 202 determines that the vehicle speed V is lower than the threshold Vs, the temperature determination portion 204 determines that the motor temperature Tm2 is higher than the threshold Tmc, the SOC determination portion 206 determines that the SOC of the battery 70 is greater than the threshold SOC (0) and the driving determination portion 208 determines that the vehicle is in the state which is not in the regeneration process for performing regeneration by the second MG 30, the motor control portion 210 switches the control mode from the normal control mode to the temperature restriction mode. Thus, the motor control portion 210 controls the output torques of the first MG 20 and the second MG 30 according to the temperature restriction mode.

In addition, under the condition that the execution flag of the temperature restriction mode is in the non-set state (the non-set state is an initial state) and the speed determination flag, the motor temperature determination flag, the SOC determination flag and the driving determination flag are all in the set states, the motor control portion 210 may also set the execution flag of the temperature restriction mode to be in the set state and controls the output torques of the first MG 20 and the second MG 30 according to the temperature restriction mode.

Figure 3:
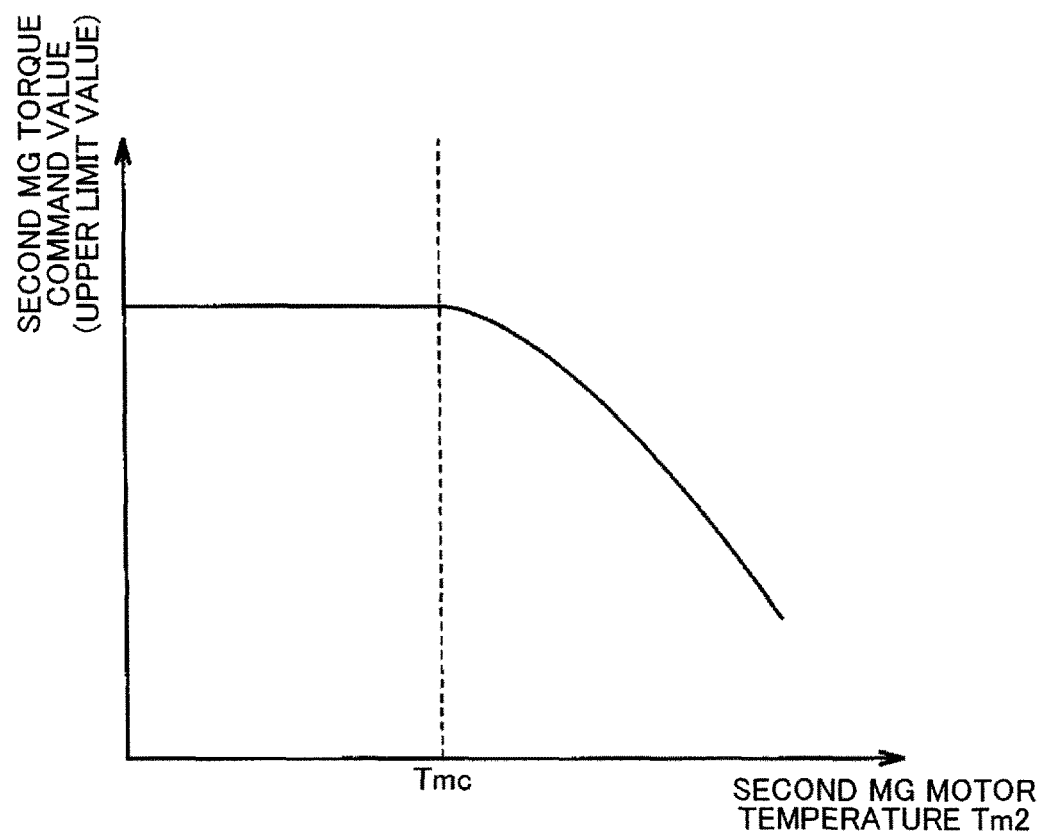
FIG. 3 is a diagram showing the relation between the temperature of a motor and the upper limit value of a torque command value.

In the temperature restriction mode, as shown in FIG. 3, in an area where the motor temperature Tm2 is higher than the threshold Tmc, the motor control portion 210 changes the upper limit value of the torque command value for the second MG 30, so that the higher the motor temperature Tm2 is, the lower the upper limit value of the torque command value for the second MG 30 is.

In the temperature restriction mode, under the condition that the driving torque required for the second MG 30 is within the upper limit value of the torque command value for the second MG 30, the motor control portion 210 outputs the torque command value corresponding to the required driving torque to the PCU 60 to control the output torque of the second MG 30, so that the driving torque required for the second MG 30 is generated by using the second MG 30 alone. In addition, in the temperature restriction mode, the engine 10 is in the stop state as described below, so the driving torque required for vehicle 1 is consistent with the driving torque required for the second MG 30.

On the other hand, in the temperature restriction mode, under the condition that the driving torque required for the second MG 30 exceeds the upper limit value of the torque command value for the second MG 30, the motor control portion 210 outputs the torque command value for the second MG 30 in correspondence to the upper limit value to the PCU 60, and outputs the torque command value for the first MG 20 in correspondence to the quantity exceeding the upper limit value (exceeding quantity) to the PCU 60, so that the exceeding quantity is compensated through the first MG 20. Thus, the output torques of the first MG 20 and the second MG 30 are controlled to generate the driving torque required for the second MG 30. In addition, the engine 10 is in the stop state as described below, so the torque command value for the first MG 20 is preferably set by considering the torque for rotate the crankshaft of the engine 10.

In the temperature restriction mode, if the speed determination portion 202 determines that the vehicle speed V exceeds the threshold Vf, the temperature determination portion 204 determines that the motor temperature Tm2 is lower than the threshold Tmc, the SOC determination portion 206 determines that the SOC of the battery 70 is smaller than the threshold SOC (0), or the driving determination portion 208 determines that the vehicle is in the regeneration process for performing regeneration by the second MG 30, the motor control portion 210 switches the control mode from the temperature restriction mode to the normal control mode.

In addition, for example, under the condition that the execution flag of the temperature restriction mode is in the set state, if the ending determination flag is in the set state or if the ending determination flag is in the non-set state and any of the motor temperature determination flag, the SOC determination flag and the driving determination flag is also in the non-set state, the motor control portion 210 also sets the execution flag of the temperature restriction mode to be in the non-set state and controls the first MG 20 and the second MG 30 according to the normal control mode.

The motor control portion 210 controls the first MG 20 to act as a power generation device by using the engine 10 as a power source in the normal control mode. That is, the motor control portion 210 may also supply the power generated in the first MG 20 by using the engine 10 as the power source to the second MG 30 or the battery 70.

The clutch control portion 212 controls the clutch 80 according to the state of the vehicle 1 in the normal control mode, so that the state of the clutch 80 is in any of the engaged state and the disengage state. For example, when the driving torque needs to be generated by the engine 10 in the vehicle 1, the clutch control portion 212 controls the clutch 80 to be in the engaged state, and when the vehicle 1 runs only by using the driving torque of the second MG 30, the clutch control portion 212 controls the clutch 80 to be in the disengage state. The clutch control portion 212 controls the clutch 80 to be in the engaged state in the temperature restriction mode. In addition, under the condition that the clutch 80 is in the disengage state when the execution flag of the temperature restriction mode is in the set state, the clutch control portion 212 may also control the clutch 80 to be in the engaged state.

The engine control portion 214 controls the engine 10 to start or stop according to the state of the vehicle 1 in the normal control mode. For example, under the condition that the SOC of the battery 70 is reduced and the battery 70 needs to be charged, the engine control portion 214 controls the engine 10 to start. By means of the starting of the engine 10, power is generated in the first MG 20 and supplied to the battery 70. Under the condition that the SOC of the battery 70 is surplus (the SOC is greater than the threshold or close to an upper limit value), the engine control portion 214 controls the engine 10 to stop.

The engine control portion 214 controls the engine 10 to stop in the temperature restriction mode. If the control mode is switched from the normal mode to the temperature restriction mode when the engine 10 is operating, the engine control portion 214 controls a fuel jet to the engine 10 to stop, so that the engine 10 stops. For example, under the condition that the execution flag of the temperature restriction mode is in the set state, the engine control portion 214 may also control the engine 10 to stop.

Figure 4:
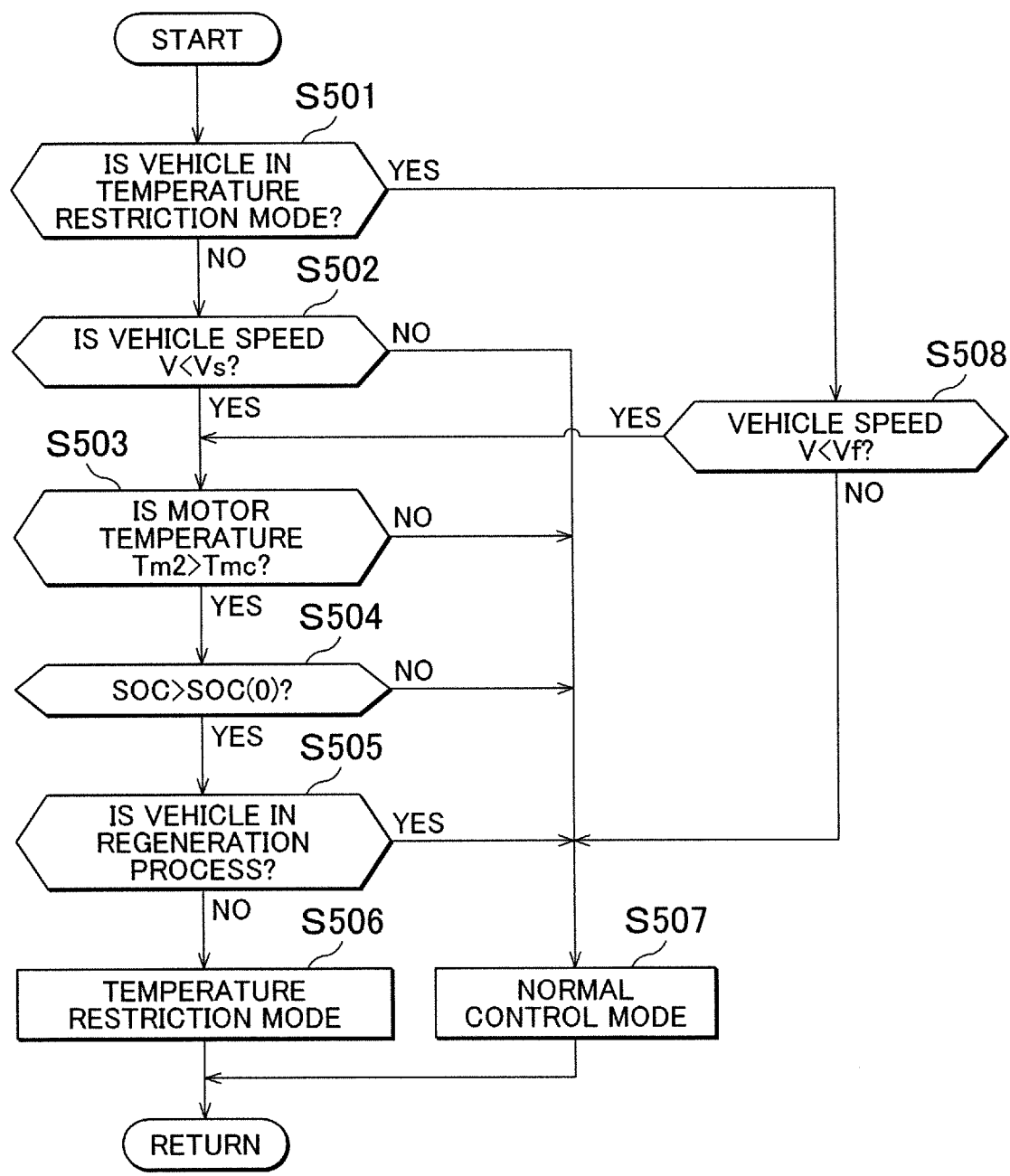
FIG. 4 is a flow chart showing control process executed by the ECU.

Refer to FIG. 4, which shows control executed by the ECU carried in the vehicle of this embodiment.

In step (step is referred as S below) 501, the ECU 200 determines whether the vehicle is in the temperature restriction mode. For example, under the condition that the execution flag of the temperature restriction mode is in the set state, the ECU 200 determines that it is in the temperature restriction mode. Under the condition that the temperature restriction mode is determined (Yes in S501), the process turns to S502. If it is not the above-mentioned determination result (No in S501), the process turns to S508.

In S502, the ECU 200 determines whether the vehicle speed V is smaller than the threshold Vs. If it is determined that the vehicle speed V is smaller than the threshold Vs (Yes in S502), the process turns to S503. If it is not the above-mentioned determination result (No in S502), the process turns to S507.

In S503, the ECU 200 determines whether the motor temperature Tm2 of the second MG 30 is greater than the threshold Tmc. If it is determined that the motor temperature Tm2 of the second MG 30 is greater than the threshold Tmc (Yes in S503), the process turns to S504. If it is not the above-mentioned determination result (No in S503), the process turns to S507.

In S504, the ECU 200 determines whether the SOC of the battery 70 is greater than the threshold value SOC (0). If it is determined that the SOC of the battery 70 is greater than the threshold value SOC (0) (Yes in S504), the process turns to S505. If it is not the above-mentioned determination result (No in S504), the process turns to S507.

In S505, the ECU 200 determines whether the vehicle is in the regeneration process. The determination method about whether the vehicle is in the regeneration process is mentioned above, and is not redundantly described in detail. If it is determined that the vehicle is in the regeneration process (Yes in S505), the process turns to S507. If it is not the above-mentioned determination result (No in S505), the process turns to S506.

In S506, the ECU 200 controls the engine 10, the first MG 20 and the second MG 30 according to the temperature restriction mode. In S507, the ECU 200 controls the engine 10, the first MG 20 and the second MG 30 according to the normal control mode.

Figure 5:
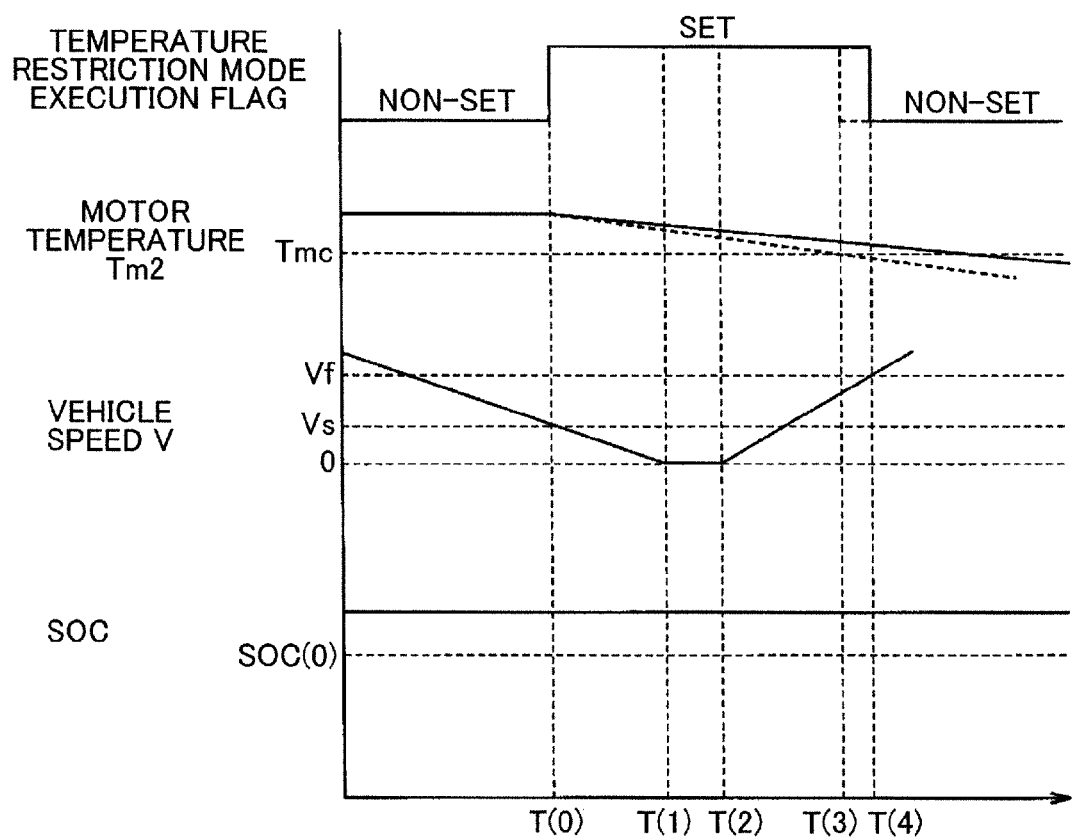
FIG. 5 is a timing chart showing the action of the ECU.

With reference to FIG. 5, the action of the ECU 200 based on the above-mentioned structure and flow chart and carried in vehicle 1 of this embodiment will be illustrated.

For example, the following condition is supposed: vehicle 1 runs in a state that the execution flag of the temperature restriction mode is in the non-set state (No in S501), the motor temperature Tm2 is greater than the threshold Tmc and the SOC of the battery 70 is greater than the threshold SOC (0).

Since the vehicle speed V is greater than the threshold Vs (No in S502), the engine 10, the first MG 20 and the second MG 30 are controlled according to the normal control mode (S507). On the other hand, as the driver depresses a brake and the like, the vehicle speed V is gradually reduced over time.

At time T(0), if the vehicle speed V is smaller than the threshold Vs (Yes in S502), the motor temperature Tm2 is greater than the threshold Tmc (Yes in S503), the SOC of the battery 70 is greater than the threshold SOC (0) (Yes in S504) and the vehicle is not in the regeneration process (No in S505), the engine 10, the first MG 20 and the second MG 30 are controlled according to the temperature restriction mode (S506).

By controlling the engine 10, the first MG 20 and the second MG 30 according to the temperature restriction mode, the engine 10 comes into the stop state, and portion of the driving torque required for the second MG 30 may be assigned to the first MG 20, so that the second MG 30 is restricted by a situation of operating with high load. As a result, the motor temperature Tm2 of the second MG 30 is gradually reduced over time.

At time T(1), after the vehicle 1 temporarily stops, the driver depresses the accelerator pedal 160 and vehicle 1 starts running at time T(2), and at time T(4), if the vehicle speed V is greater than the threshold Vf (No in S508) in the temperature restriction mode (Yes in S501), the engine 10, the first MG 20 and the second MG 30 are controlled according to the normal control mode (S507). Or, at time T(3) ahead of time T(4), if the motor temperature Tm2 is lower than the threshold Tmc (No in S503) as shown by the dotted line of FIG. 5, the engine 10, the first MG 20 and the second MG 30 are controlled according to the normal control mode (S507).

As mentioned above, according to the vehicle of this embodiment, when the second MG 30 cannot generate the predetermined output torque in the disengagement of the clutch 80, the clutch 80 is engaged, the engine 10 is in the stop state, and the first MG 20 is controlled, so that a driving torque is generated at the driving wheel 49. Thus, the quantity that the output torque is limited in the second MG 30 may be compensated through the first MG 20. Thus, a hybrid vehicle is provided that is able to generate a driving torque corresponding to the requirement of a driver even under the condition that the output of a motor generating the driving torque is limited.

Moreover, since the engine 10 is in the stop state, fuel consumption and exhaust generated when the engine 10 operates can be inhibited. Thus, fuel consumption and emission performance deterioration can be inhibited.

Moreover, in an area where the vehicle speed V is lower than the threshold Vs, the first MG 20 is controlled to generate the driving torque, and thus, the driving torque corresponding to the requirement of the driver can be generated when accelerating, e.g. the vehicle 1 starts.

Moreover, under the condition that the SOC of the battery 70 is greater than the threshold SOC (0), the first MG 20 is controlled to generate the driving torque, and thus, the driving torque corresponding to the requirement of the driver can be generated even if the engine 10 is maintained in the stop state.

Moreover, after the first MG 20 is controlled to generate the driving torque, under the condition that the vehicle speed V becomes higher than the threshold Vf, the first MG 20 is controlled according to the normal mode to stop generating the output torque, and thus, after the first MG 20 is controlled to generate the driving torque, the first motor may stop generating the output torque at an appropriate time (e.g. at the vehicle speed that the engine 10 can assist in the driving torque).

Moreover, the first MG 20 is controlled to generate the driving torque, so that it is effective as follows: the shortfall of the driving torque when vehicle 1 starts during traction (e.g. the vehicle 1 trails a trailer such as a fault vehicle or a camping trailer) can be compensated by using the driving torque generated by the first MG 20.

In this embodiment, the following condition is described: in the temperature restriction mode, when the required driving torque is within the upper limit value of the torque command value for the second MG 30, only the second MG 30 is utilized to generate the required driving torque; and when the driving torque exceeding the upper limit value of the torque command value for the second MG 30 is required, the upper limit value of the torque command value for the second MG 30 is output to the second MG 30 as a torque command value, and the exceeding quantity is compensated through the first MG 20, but the following condition may be permitted. For example, in the temperature restriction mode, when the driving torque required for the second MG 30 is within a value obtained by subtracting a predetermined value (a torque for rotating the crankshaft of the engine 10 in the stop state) from the upper limit value of the torque command value for the first MG 20, only the first MG 20 is utilized to generate the required driving torque; and when the driving torque exceeding the value obtained by subtracting the predetermined value from the upper limit value of the torque command value for the first MG 20 is required, the upper limit value of the torque command value for the first MG 20 is output to the first MG 20 as a torque command value, and the shortfall is compensated through the second MG 30. Thus, the temperature of the second MG 30 can be reduced more rapidly.

In addition, in this embodiment, the state that the second MG 30 can not generate the predetermined output torque is described by taking the state that the temperature Tm2 of the second MG 30 is greater than the threshold Tmc as an example, and may also be described by the state that the temperature TB of the battery 70 is greater than the threshold TBc, or the state that the temperature of the PCU 60 (e.g. the inverter connected with the second MG 30 or the switching element in the inverter) is greater than the threshold.

In this embodiment, the following condition is described: the temperature restriction mode is switched to the normal control mode when the vehicle speed V is greater than the threshold Vf, but the following condition is also possible: the temperature restriction mode is switched to the normal control mode by using the depressing amount AP of the accelerator pedal 160 as a condition.

Figure 6:
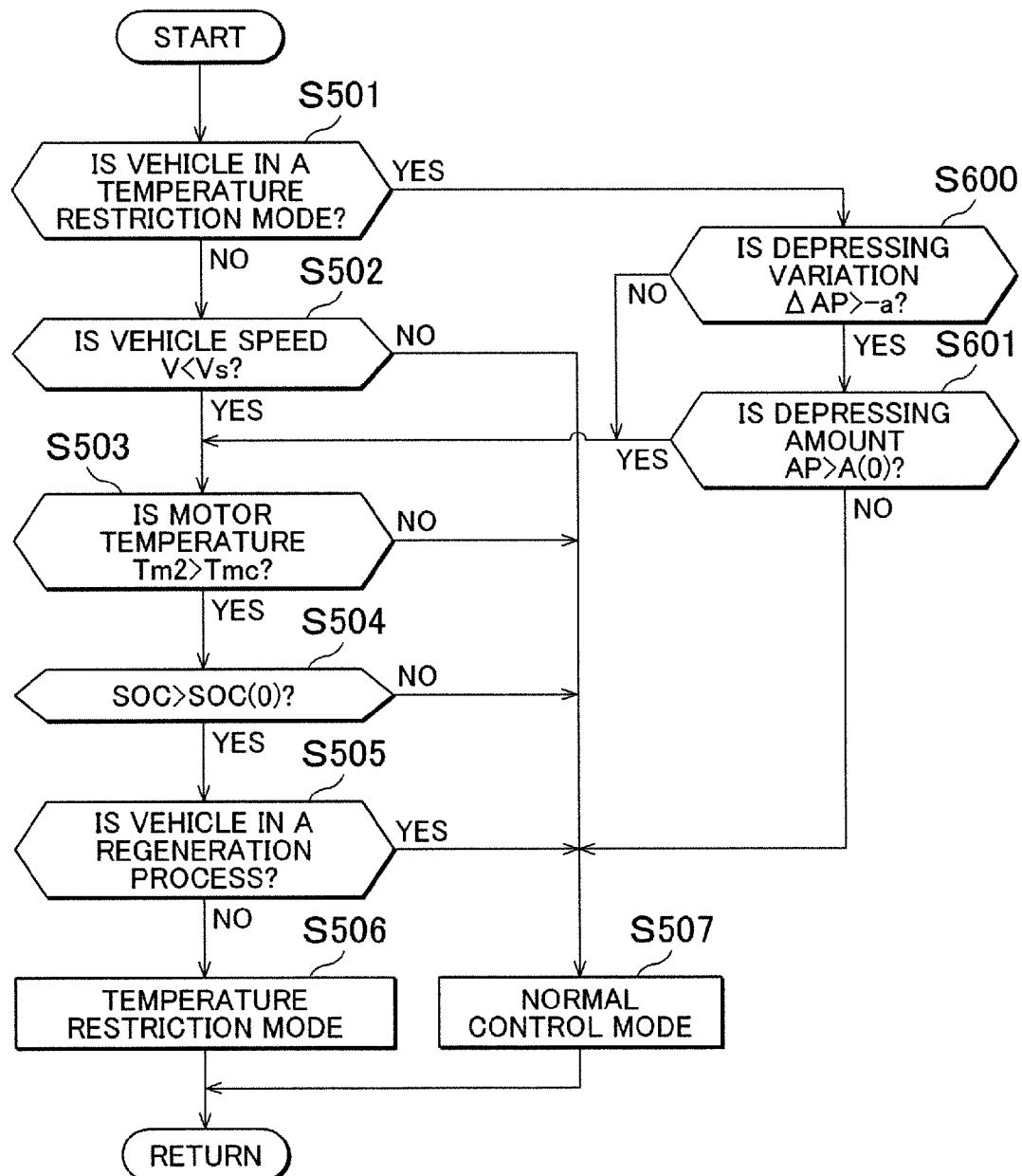
FIG. 6 is a flow chart showing control process executed by the ECU in a modified embodiment.

This modified embodiment may be realized through the control process shown by the flow chart of FIG. 6.

In addition, the process of S501-S507 of the flow chart of FIG. 6 is the same as that of S501-S507 of the flow chart of FIG. 4. Thus, it will not be redundantly described herein.

Under the condition that the temperature restriction mode is determined (No in S501), in S600, the ECU 200 determines whether the variation (referred as depressing variation below) ΔAP of the depressing amount AP of the accelerator pedal 160 is greater than a threshold −a. The threshold −a is a negative value, and is a value for determining a condition that the depressing amount AP of the accelerator pedal 160 does not have a relatively large change in the direction enabling the accelerator pedal 160 to return to an initial position. Under the condition that the depressing variation ΔAP is greater than the threshold −a as determined (Yes in S600), the process turns to S601. If it is not the above-mentioned determination result (No in S600), the process turns to S503.

In S601, the ECU 200 determines whether the depressing amount AP of the accelerator pedal 160 is greater than a threshold AP(0). Under the condition that the depressing amount AP of the accelerator pedal 160 is greater than the threshold AP(0) as determined (Yes in S601), the process turns to S503. If it is not the above-mentioned determination result (No in S601), the process turns to S507.

Thus, in the temperature restriction mode, when the depressing amount AP of the accelerator pedal 160 does not have the relatively large change in the direction enabling the accelerator pedal 160 to return to the initial position and the depressing amount AP of the accelerator pedal 160 is smaller than the threshold AP(0), the temperature restriction mode is switched to the normal control mode. Thus, the temperature restriction mode can be switched to the normal control mode under the situation of estimating the condition that the driving torque required for the second MG 30 is not high. Under the condition that the first MG 20 generates the driving torque, compared with the condition that only the second MG 30 is utilized to generate the driving torque, the loss of running energy is increased, and thus the temperature restriction mode is switched to the normal control mode at an appropriate time, so that the loss of the running energy can be reduced or restricted.

The above-mentioned disclosed embodiments should be considered as examples on all aspects rather than restrictive structures. The protection scope of the present invention is shown by the protection scope of claims rather than the above-mentioned description, and includes the meaning equivalent to the protection scope of the claims and all alterations within the protection scope of the claims.

What is claimed is:

1. A hybrid vehicle, comprising:
an engine;
a first motor connected with an output shaft of the engine;
a second motor connected with a driving wheel, the second motor configured to generate a driving torque at the driving wheel;
a rotary shaft connected with the driving wheels;
a clutch arranged between the output shaft of the engine and the driving wheel, the clutch configured to engage or disengage the output shaft of the engine and the rotary shaft; and
an electronic control unit configured to, when the second motor cannot generate a predetermined output torque and the clutch is disengaged, control the clutch to be engaged, control the engine to stop and control the first motor to generate the driving torque at the driving wheel.

2. The hybrid vehicle according to claim 1, wherein, the electronic control unit is configured to control the first motor to stop generating output torque when a vehicle speed becomes higher than a threshold, after the first motor is controlled to generate the driving torque at the driving wheel.

3. The hybrid vehicle according to claim 1, wherein,
the electronic control unit is configured to control the first motor to stop generating output torque when following conditions i) and ii) are satisfied, after the first motor is controlled to generate the driving torque at the driving wheel,
  i) a depressing amount of an accelerator pedal is smaller than a first threshold, and
  ii) a variation of the depressing amount in a direction of returning the accelerator pedal is smaller than a second threshold.

4. The hybrid vehicle according to claim 1, further comprising a motor temperature sensor that detects the temperature of the second motor, wherein,
the electronic control unit is configured to control the first motor to compensate a shortfall of the output torque of the second motor by the output torque of the first motor, when the temperature of the second motor is higher than a threshold.

5. The hybrid vehicle according to claim 4, wherein,
the electronic control unit is configured to control the first motor to generate the driving torque at the driving wheel, when a vehicle speed is lower than a threshold.

6. The hybrid vehicle according to claim 4, further comprising an electrical storage device configured to supply power to the second motor, wherein,
the electronic control unit is configured to control the first motor to generate the driving torque at the driving wheel, when a state quantity representing a charge state of the electrical storage device is greater than a threshold.

* * * * *